Patented Nov. 30, 1926.

1,609,239

UNITED STATES PATENT OFFICE.

HENRY BLUMENBERG, JR., OF LOS ANGELES, CALIFORNIA, ASSIGNOR TO STOCK-HOLDERS SYNDICATE, OF LOS ANGELES, CALIFORNIA, A CORPORATION OF CALIFORNIA.

PROCESS OF MAKING PHOSPHORIC ACID.

No Drawing.　　　Application filed April 30, 1925. Serial No. 27,066.

My invention relates to a process of making phosphoric acid, and has for its object to provide a simple, efficient and economic process of making phosphoric acid, using as the principal agent, sulphur dioxide.

The same consists in the steps of the process hereinafter described and claimed.

Crude phosphate rock $Ca_3(PO_4)_2$ is ground to suitable fineness, such as 100 mesh, and mixed with water in the presence of sulphur dioxide. For example, 100 parts by weight of water, are added to 10 parts of pulverized phosphate rock, and the mixture is saturated by any suitable means with sulphur dioxide. The sulphur dioxide in the presence of water will form sulphurous acid. Within twenty-four hours the following chemical reactions will take place, as indicated.

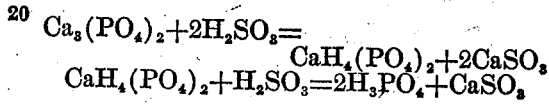

It is well known that calcium phosphates are more or less soluble in sulphurous acid, but the novel feature of my process consists in maintaining the sulphur dioxide in excess in the mixture, so that the phosphoric acid liberated is prevented from re-acting on the calcium sulphite formed.

By keeping the mixture super-saturated with sulphur dioxide and under pressure—pressure not to exceed five pounds is sufficient—no reversion will take place, that is to say, when the $SO_2$ radicle is in excess over the $PO_4$ radicle when the latter is liberated from the calcium ion, the reaction will take place as indicated in the chemical equations above stated.

In processes of the prior art, the calcium phosphate is mixed with solutions of sulphurous acid in water, and the phosphate rock re-acts with the sulphurous acid, becoming neutralized and forming a semi-calcium di-hydrogen phosphate and calcium sulphite.

My new process prevents this reversion by keeping the mixture under pressure and with the sulphur dioxide in excess, so that at the moment the insoluble calcium sulphite is formed the liberated $PO_4$ radicle cannot re-act on the calcium sulphite as the $SO_3$ radicle taken from the solution is replaced by the continual excess of sulphur dioxide gas introduced or charged into the solution.

My process is a selective process and attacks only the calcium phosphate and calcium carbonates.

Various steps in the process may be made by those skilled in the art without departing from the spirit of my invention, as claimed.

I claim:

A process of making phosphoric acid comprising subjecting the finely ground calcium phosphate in the presence of water to sulphur dioxide under pressure the quantity of sulphur dioxide being in excess of that required to form sulphurous acid with the water.

In testimony whereof I have signed my name to this specification.

HENRY BLUMENBERG, JR.